(12) United States Patent  (10) Patent No.: US 6,508,991 B2
Keppel  (45) Date of Patent: Jan. 21, 2003

(54) EMISSION CONTROL DEVICE AND METHOD

(75) Inventor: Paul D. Keppel, Mooresville, NC (US)

(73) Assignee: Global Environmental Concepts, LLC, Carson City, NV (US)

( * ) Notice: Subject to any disclaimer, the term of this patent is extended or adjusted under 35 U.S.C. 154(b) by 0 days.

(21) Appl. No.: 09/809,990

(22) Filed: Mar. 16, 2001

(65) Prior Publication Data

US 2002/0157941 A1 Oct. 31, 2002

(51) Int. Cl.[7] ................................................ B01J 19/08
(52) U.S. Cl. ................................... 422/186.21; 204/179
(58) Field of Search .......................... 422/186, 186.04, 422/186.21; 204/164, 179

(56) References Cited

U.S. PATENT DOCUMENTS

| | | | | |
|---|---|---|---|---|
| 3,983,021 A | * | 9/1976 | Henis | 204/164 |
| 4,954,320 A | * | 9/1990 | Birmingham et al. | 422/186.04 |
| 5,236,672 A | * | 8/1993 | Nunez et al. | 422/186.04 |
| 5,419,123 A | * | 5/1995 | Masters | 60/274 |
| 5,733,360 A | * | 3/1998 | Feldman et al. | 422/186.04 |

* cited by examiner

*Primary Examiner*—Kishor Mayekar
(74) *Attorney, Agent, or Firm*—Dougherty, Clements & Hofer

(57) ABSTRACT

An emission control device and method are provided for treating exhaust to reduce pollutants contained therein. The device includes a first chamber through which the exhaust passes. First and second metal grids are disposed within the first chamber at a predetermined distance from each other. Voltage is supplied to the insulated first grid by an electrical induction coil at a predetermined frequency depending upon the application. Electrical charges are generated between the first and second grids which electrically ionizes the exhaust stream. The exhaust stream is then further treated at a second chamber having strata. The strata can further include or exclude noble metals for treatment of the exhaust.

29 Claims, 2 Drawing Sheets

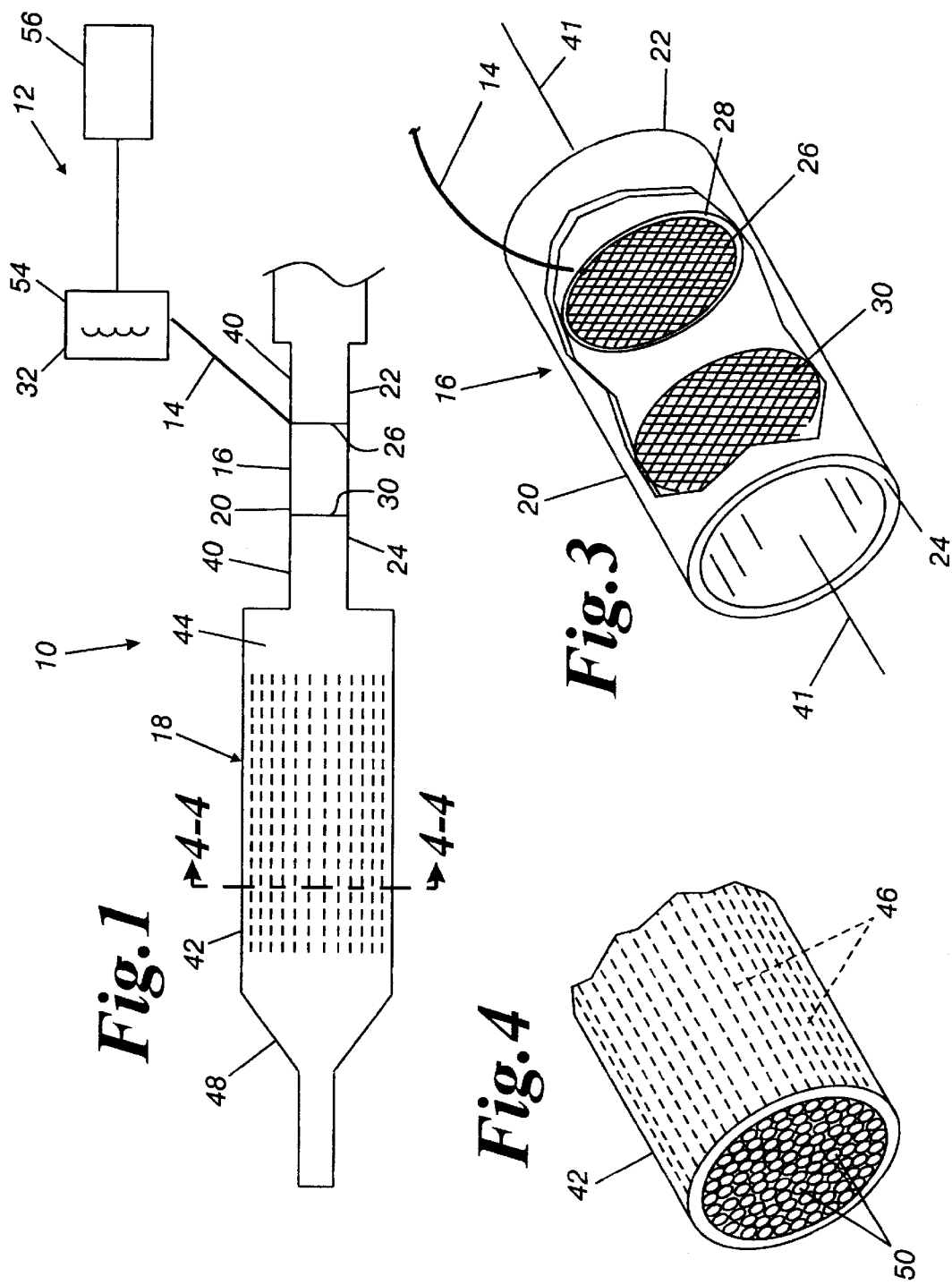

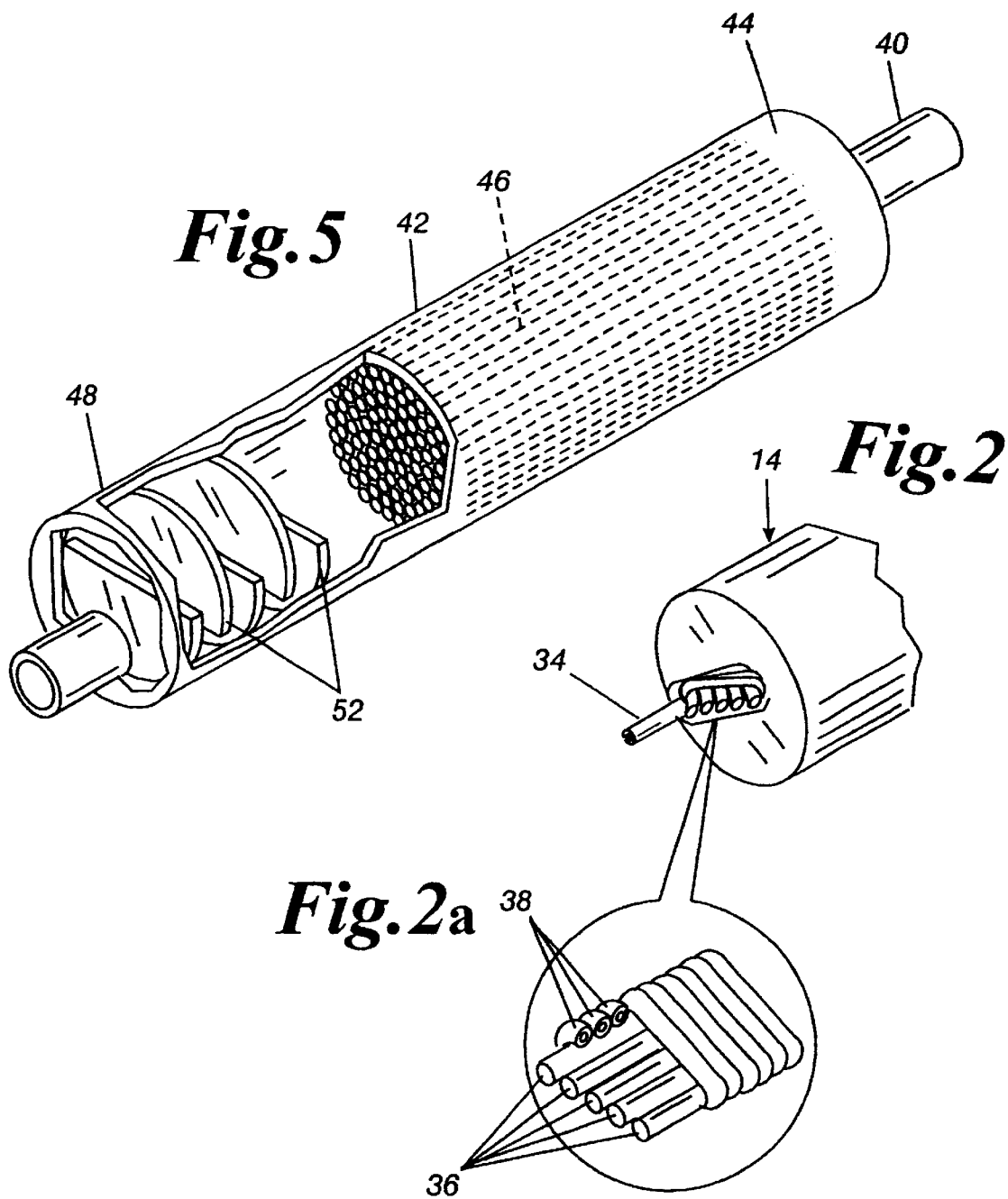

EMISSION CONTROL DEVICE AND METHOD

FIELD OF THE INVENTION

The present invention relates generally to an apparatus and method for treating exhaust gases, and more particularly to a combustion engine treatment device for removing and/or reducing pollutants contained in the combustion engine effluent gases. In particular, the present invention reduces carbon dioxide, substantially reduces hydrocarbons and nitrous oxides, and virtually eliminates the exhaust of carbon monoxide from those gases in the exhaust stream.

1. Background of the Invention

With the increasing use of automobiles, trucks, aircraft, and other combustion engine vehicles, growing concern over the gaseous pollutants emitted by these sources is justifiably mounting. Carbon monoxide, the toxic by-product of incomplete combustion, is a major contributor to air pollution and poses a very real threat to public health. Carbon dioxide, although non-toxic, is recognized as an air pollutant that directly causes the "greenhouse effect." Modem fuels generate excessive amounts of carbon dioxide which scientists report are contaminating the atmosphere worldwide. Additionally, today's engines also generate an unhealthy amount of toxic hydrocarbons which are generally responsible for eye irritation, nasal congestion and breathing difficulties.

In addition to the problems caused by exhaust emissions from combustion engines, significant exhaust pollution is also created from industrial effluent stacks as exemplified in spray booths, styrene manufacturing and the burning of hazardous waste, among a variety of industrial processes.

Numerous devices and methods are known in the art for the control of exhaust gas contaminants. Among those methods, electrostatic precipitation is widely used in such applications and involves the application of high voltages to electrodes positioned in the exhaust gas stream. This process induces ionization of gas particles which in turn causes particulates suspended in the gas to acquire a charge from contact with the ionized gas particles. The charged particles are then collected at oppositely charged diodes which must be eventually "cleaned" or "scrubbed". A significant drawback of electrostatic precipitation is that only a small amount of particulate matter can be precipitated out of the exhaust stream. The process is ineffective at removing gaseous contaminants such as carbon monoxide and carbon dioxide.

Burners, activated carbon and water curtains are also widely used to reduce hydrocarbon and volatile organic compound emissions. However, these pollution control devices are impractical for use with internal combustion engines. Additionally, a significant drawback of burners and water curtains is a large operational cost and activated carbon is easily clogged when treating a particulate laden air stream.

In the automobile industry, in efforts to meet increasingly more stringent vehicle emissions standards, some manufacturers have begun using multiple catalytic converters on their vehicles. However, the conventional catalytic converter is expensive to manufacture since platinum, palladium or rhodium is used in its manufacture.

2. Description of the Prior Art

Applicant is aware of the following U.S. Patent:

| U.S. Pat. No. | Inventor | Issue Date | Title |
| --- | --- | --- | --- |
| 5,419,123 | Masters | May 30, 1995 | EMISSION CONTROL DEVICE AND METHOD |

Masters, U.S. Pat. No. 5,419,123, discloses an emission control device and method for treating exhaust gases to reduce pollutants contained therein. The device includes a treatment chamber having a first metal screen, a second metal screen and a perforated chemical substrate disposed between the first and second metal screens. An electrode is disposed a distance from the first screen. Voltage is applied to this electrode so that sparks are generated between the electrode and the first screen.

Although the Masters patent may reduce emissions in the exhaust stream, it has several limitations. Firstly, a plug is used to deliver the spark. This area of the plug is concentrated to a portion of the first screen and hence is not evenly distributed over the entirety of the screen. Consequently, a portion of the gas stream is not sufficiently treated under this method. This problem becomes more pronounced if the plug becomes angled towards or away from the first screen.

Secondly, since the voltage is applied to the plug via standard wiring, there are significant losses such that only about thirty percent (30%) of the voltage generated is actually applied to the plug. Accordingly, for 15,000 volts to be delivered to the plug, about 50,000 volts must be supplied. This high voltage is particularly problematic when used with an automobile since it can cause random cycling frequency in the automobile's circuitry sufficient to send false codes to the automobile's computers or even damage the computers.

Thirdly, by placing the first and second screens on opposite sides of the strata, sparks are not generated between the screens.

SUMMARY OF THE INVENTION

The present invention provides a superior apparatus and method for reducing or eliminating emissions from a gas stream. The gas stream is treated by a treatment chamber in series with a second chamber having perforated strata. The treatment chamber includes an insulated first metal grid supplied with high voltage and a second metal grid that is grounded to the treatment chamber to generate an electrical charge over the entirety of the first grid to the second grid thereby causing electronic ionization. Since all of the gas stream is required to flow through the first and second grids, all of the gas stream is fully treated.

The second metal grid is conductively connected to the second chamber containing strata and, therefore, the entire connection and the second treatment chamber are also electronically ionized. Due to the treatment caused by a more complete electronic ionization, the strata can more fully perform its function with significantly less use of noble metals than with a conventional catalytic converter. Although maximum pollution reduction occurs with the use of about one tenth ($1/10$) of a troy ounce of platinum, rhodium, or palladium per converter, favorable results can also be achieved without using noble metals whatsoever.

A further advance, in the form of a special electrical cable, is a high efficiency induction coil. This induction coil applies voltage from a power coil to the insulated first metal grid at an efficiency of at least eighty percent (80%) thereby generating a very hot electrical charge between the first grid and the second grid. This induction coil is further configured to dampen the magnetic field created by the power coil. Dampening the magnetic field is particularly important in automotive applications and other applications which are integrated with computers since the magnetic field can create random cycling current in the electrical system causing false signals to be sent to the automotive computers.

Yet another advance is that the present invention reduces carbon dioxide, substantially reduces NOx and hydrocarbons, and virtually eliminates the exhaust of carbon monoxide. The invention can be used to treat emissions from industrial effluent stacks, spray booth, styrene manufacturing, the burning of hazardous waste and purifying air streams among a variety of other industrial processes. It is particularly useful for treating emissions from the combustion of all carbon or fossil fuels. The system can be installed as original equipment, as an add on device or as an after market device.

OBJECTS OF THE INVENTION

The principal object of the present invention is to provide an improved apparatus and method for reducing pollutants from an exhaust stream. The apparatus includes a first body forming a first chamber. The first and second metal grids are fixed within the first chamber so that the exhaust stream entering the first chamber passes through the grids. An electrical connector is attached to either the first grid or the second grid and connects that grid to a voltage source causing an electrical charge to be generated between the first grid and the second grid. A pulsing mechanism pulses the applied voltage at a predetermined frequency. A second body forming a second chamber has perforated strata through which the exhaust stream flows.

Another object of the invention is to provide a voltage difference between the first grid and the second grid of at least 20,000 volts. The grid receiving the voltage is insulated from the first body while the other grid is grounded. Additionally, the pulsing mechanism is capable of pulsing the voltage at a frequency of greater than 1,600 pulses per minute.

A further object of the present invention is to fix the nearer of the first or second grid a distance between about 2.54 centimeters (1 inch) and 30.48 centimeters (12 inches) from the strata. Additionally, another object is to space the first grid from the second grid a distance between about 0.635 centimeter (¼ inch) to 2.54 centimeters (1 inch).

Another object of the present invention is to use an electrical connector which is adapted to apply at least eighty percent (80%) of the voltage the connector receives.

A further object of the present invention is for the electrical connector to include a plurality of bare wires juxtaposed in a first curvilinear row and coiled equal-distantly about a curvilinear centerline thereby forming a curvilinear helix shape. A plurality of insulated wires are juxtaposed A still further object is for the electrical connector to use four or more bare wires, three or more insulating wires and an insulated center core.

Another object of this invention is to provide a method of treating an exhaust stream to reduce pollutants contained therein. The method includes the steps of passing the exhaust stream through a first body forming a chamber. The exhaust stream is passed through a first grid and a second grid fixed within the chamber. The grids are separated a predetermined distance from each other. Voltage is supplied from a voltage source to either the first or the second grid to generate an electrical charge between the first grid and the second grid. The voltage is pulsed at a predetermined frequency. The exhaust stream further passes through a strata.

A further object of the invention is to provide a voltage difference between the first grid and the second grid of at least 20,000 volts at a frequency of at least 1,600 pulses per minute. The voltage receiving grid is insulated from the first body while the other grid is grounded.

BRIEF DESCRIPTION OF THE DRAWINGS

The foregoing and other objects will become more readily apparent by referring to the following detailed description and the appended drawings in which:

FIG. 1 is a diagrammatic view of an embodiment of the present invention shown in use as an emission control device;

FIG. 2 is a perspective view shown in partial cut-away of a induction coil;

FIG. 2a is a perspective view of a detail showing the induction coil of FIG. 2;

FIG. 3 is a perspective view shown in partial cut-away of a treatment chamber;

FIG. 4 is a perspective fragmentary view taken along line 4—4 of FIG. 1 showing a second chamber having a strata; and FIG. 5 is an perspective view shown in partial cut-away showing an alternative embodiment of the second chamber having baffles.

DETAILED DESCRIPTION

FIG. 1 generally illustrates a system 10 for treating an exhaust stream by reducing pollutants contained therein. The system 10 includes a power coil 12, an induction coil 14, a first chamber 16 and a second chamber 18.

Per FIG. 3, the first chamber 16 includes a continuous outer wall 20, an intake end 22 and an exhaust end 24. An insulated first metal grid 26 is disposed within the treatment chamber and separated from the outer wall 20 by an insulator 28. A grounded second metal grid 30 is disposed within and attached to the treatment chamber 16 a predetermined distance from the insulated first metal grid 26. The power coil 12 is connected to the insulated first metal grid 26 via the induction coil 14. A frequency mechanism 32 is provided for pulsing the voltage supplied to the insulated first metal grid 26 at a predetermined optimum frequency depending upon the application.

As shown in FIGS. 2 and 2-A, the induction coil 14 comprises a standard plug core 34, a plurality of copper wires 36 juxtaposed in a row and a plurality of insulated copper wires 38 juxtaposed in a row. The insulated copper wires 38 are wrapped throughout the length of the copper wire 36 cluster, and the combination thereof is wrapped throughout the length of the plug core 34. Although any number of arrangements are possible, preferably the insulated copper wires 38 are a group of three or more, and four or more wires comprise the cluster of copper wires 36. A metal eyelet can be provided to ground the induction coil 14. The wires 34, 36,38 are standard wires. For example, the standard plug core can be 8 millimeters and made of silicon or copper, the copper wires 36 can be 18 gauge and the insulated wires 38 can be 18 gauge.

As shown in FIG. 1, the first chamber 16 is a segment of an exhaust conduit 40. Preferably the first chamber 16 is upstream of the second chamber 18. The first chamber 16 can also be placed generally anywhere in-line in the exhaust system such as, for example, after the second chamber 18. However, such positioning is less efficient in pollution reduction.

Referring to FIG. 3, the first chamber 16 is preferably cylindrical and formed of metal. The first and second metal grids 26,30 are perpendicular to a central axis 41 of the first chamber 16. The grids 26, 30 have a meshed pattern and completely fill the cross-sectional area of the first chamber 16 so that all of the exhaust passes therethrough. The first grid 26 is insulated from, and secured to, the continuous wall 20 by any conventional means 28. The grounded second grid 30 is conductively secured to the continuous wall 20 by any conventional means such as welding. It is preferred that the grids 26, 30 are fabricated from chromium, stainless steel or magnesium alloy, however, other conductive compositions can also be used. The induction coil 14 passes through the continuous wall 20 and attaches to the insulated first grid 26 to directly apply voltage thereto. When voltage is applied to the insulated first grid 26, the entire first grid 26 is placed at the supplied voltage potential causing electrical charges to be generated across the gap between the insulated first grid 26 and the grounded second grid 30. Although the first grid is shown upstream of the second grid 30, this positioning can be reversed.

As shown in FIGS. 1, 4 and 5, the second chamber 18 is preferably cylindrical and has a metal shell 42. The second chamber 18 includes a proximal diffusion end 44, a central portion filled with strata 46 and a distal end 48 for exhausting the treated exhaust. The strata 46 can be formed of silica or metal having between 7.9 holes per centimeter (20 holes per inch) and 157.5 holes per centimeter (400 holes per inch) to allow the exhaust stream to flow therethrough. Larger holes 50 are preferred when treating heavier flows such as emissions from a diesel engine while smaller holes 50 are used with lighter emissions. Preferably, the holes 50 are generally linear and parallel with a central axis of the second chamber 18. However, a honeycomb strata can be used. Typically the strata 46 will contain about one-tenth ($\frac{1}{10}$) of one troy ounce or less of noble metals such as palladium, platinum or rhodium depending upon the application. Alternatively, the strata can be formed without noble metals.

As shown in FIG. 5, the distal end 48 can be provided with a series of baffles 52 which muffles sound and can serve to replace a standard muffler depending upon the application.

Referring to FIG. 1, in operation the pollutant laden exhaust stream flows through the exhaust conduit 40 into the first chamber 16 through the intake end 22, passes through the insulated first grid 26, then through the grounded second grid 30 before exiting the exhaust end 24. A predetermined distance between the first and second grids 26, 30 typically ranges from 0.635 centimeter ($\frac{1}{4}$ inch) to 2.54 centimeters (one inch) depending on the voltage of the first grid 26. In general, the grids 26, 30 are spaced a distance of 0.318 centimeter ($\frac{1}{8}$ inch) for the first 20,000 volts and then an additional 0.318 centimeter ($\frac{1}{8}$ inch) for each 10,000 volt increment. The first chamber 16 can be located anywhere in-line in the exhaust system but generally is placed between 2.54 centimeters (one inch) and 30.48 centimeters (12 inches) from the second chamber 18 depending upon the application.

Any power coil and pulsing mechanism sufficient to supply the necessary voltage at the proper frequency can be used. The applicant has determined that a voltage of at least 20,000 volts at a pulse rate of at least 1,600 pulses per minute is preferred for optimizing the reduction of carbon monoxide, hydrocarbons and NOx depending on the exhaust stream being treated. Typically the voltage will be in the range of 40,000 to 100,000 volts and the pulse rate will be in the range of 1,600 to 10,000 pulses per minute. In general, wetter exhaust such as the exhaust from a diesel internal combustion engine requires higher voltage and pulse frequency than emissions from lighter fuels such as unleaded gasoline or propane. For example, with a gasoline powered automotive internal combustion engine, an output between 40,000 to 60,000 volts at 2,000 to 5,000 pulses per minute is preferred for optimizing reduction of carbon monoxide, hydrocarbons and NOx depending upon the application. The voltage and frequency are also set in proportion to the displacement of the engine with the upper values more suitable for larger engines.

A power coil 12 can be any voltage source that provides the predetermined voltage. A pulsing mechanism can be any device which sets the voltage at the proper frequency. As an example, and not to so limit the present invention, FIG. 1 illustrates that the power coil 12 can comprise a voltage box 54 and an automotive battery 56. The primary windings of the voltage box 54 is supplied with approximately three (3) amperes from a twelve volt automotive battery 56 and outputs 40,000 volts to the induction coil 14 at a pulse rate of about 2,500 pulses per minute depending upon the application. As a further example, small engines, such as two cycle engines can have a dual magneto that can supply voltage at the proper frequency to the first grid 26 by. the magneto without use of a battery or voltage box.

The inventive induction coil 14 is configured to deliver at least eighty percent (80%) of the voltage to the insulated first grid 26 and to dampen the magnetic field created by the induction coil 14 itself. Measured on an alternating current scale, this dampening effect caused by the induction coil 14 avoids creating radio frequency interference (cycling frequency) greater than 0.4 volts in the induction coil 14 itself, and preferably less than 0.4 volts in the adjacent wiring.

Per FIG. 2, current supplied through the core wire 34 creates a magnetic field. Per FIG. 2a, this magnetic field is dampened by the combination of copper wires 36 and the insulated copper wires 38. Dampening the magnetic field is particularly important in automotive applications and other applications which are integrated with computers. This is true since an undampened magnetic field can create random cycling current in the electrical system and at a level of approximately 0.5 volts false signals are sent to the automotive computers.

While not wishing to be bound to any particular theory, it is believed that exhaust pollutants are treated by electronic ionization at both the chemical and thermal levels. Referring to FIG. 1, electronic ionization is caused by supplying voltage at a frequency to the insulated first grid 26. Electronic ionization occurs between the first and second grids 26, 30. Additionally, the exhaust conduit 40 and second chamber 18, including the strata, 46 are ionized. Since the insulated first grid 26 receives the entire exhaust stream and the voltage is supplied to the entirety of the insulated first grid 26, all of the exhaust is fully treated by electronic ionization.

Exhaust exiting the first chamber 16 enters the second chamber 18 and passes through the strata 46. The second chamber 18 treats the ionized exhaust stream by use of a catalyst in addition to electronic ionization. Presently, the preferred strata 46 contains about one-tenth ($\frac{1}{10}$) of one troy ounce of noble metals such as, for example, platinum, palladium or rhodium which serve as a catalyst. The catalyst oxidizes carbon monoxide and hydrocarbon pollutants to form carbon dioxide and water. The catalyst also oxides NOx to form nitrogen and oxygen. The strata 46 also has the benefit of producing free radical molecules of oxygen ($O_2$) during operation of the emission control system 10. Ozone ($O_3$) is created at the first grid 26 and the strata 46 oxidizes that ozone to generate oxygen therefrom.

Alternatively, the strata in the second chamber 18 can be made of metal or silica. The applicant has found that the pollutant removal efficiency of the system 10 without noble metals is comparable to that of current catalytic converters. Although the present invention can be used with a standard catalytic converter, the reduction or elimination of noble metals from the second chamber 18 provides significant cost savings.

Another important benefit of the present invention is its extremely short start-up time. The system 10 can be at full operating condition in as little as twenty to thirty seconds depending upon the application. For automotive use, voltage is supplied to the insulated first grid 26 in the first chamber 16 as soon as the ignition is turned to the "key-on" position thereby generating an electrical charge before exhaust is generated. Furthermore, although higher temperatures can be used, the second chamber 18 fully operates at low heat typically in the range of 64° C. (160° F.) to 93° C. (200° F. as measured at the outside shell 42. This shell temperature correlates to an exhaust temperature of approximately 204° C. (400° F.). Conventional catalytic converters take four or five minutes of engine warm-up time to reach operating temperatures of about 316° C. (600° F.) at the outside shell and 982° C. (1800° F.) internally. Since the system 10 operates at relatively low heat, extensive heat shielding is not required for the second chamber 18. Such low heat also reduces the probability of fires as caused by current catalytic converter systems. Additionally, since the system 10 operates independently of the engine, it does not require expensive interactive controls with the engine nor is a thermocouple necessary.

Although the present invention has been explained primarily in use with an automobile, the present invention is not limited to such. For example, the system 10 could be mounted to an industrial effluent stack, to an exhaust stack from a spray booth, or to any such variety of other effluent stacks. For such other applications the first chamber 16 could be supplied pulsed voltage from any number of independent sources.

SUMMARY OF THE ACHIEVEMENT OF THE OBJECTS OF THE INVENTION

From the foregoing, it is readily apparent that I have invented an improved method and apparatus for reducing or eliminating pollutants, including gaseous pollutants, from an exhaust stream.

It is also apparent that the reaction and reduction occurs at the grids and at the catalytic converter that is operable at a relatively low temperature.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A system for treating an exhaust stream for reducing pollutants therein, said system comprising:
    a first body forming a first chamber, said chamber having an intake end and an exhaust end;
    a first grid fixed within said first chamber so that the exhaust stream entering said first chamber passes through said first grid;
    a second grid fixed within said first chamber so that the exhaust stream passes through said second grid after passing through said first grid;
    an electrical connector attached to either of said first grid or said second grid so that upon applying a voltage to said connector, electrical charges are generated between said first grid and said second grid;
    a voltage source connected to said connector; and
    a pulsing mechanism operatively configured with said voltage source to cause the voltage supplied to said connector from said voltage source to be pulsed at a predetermined frequency create electric arcs between said first and second grids.

2. The system according to claim 1 wherein said voltage source is adapted to provide a voltage difference between said first grid and said second grid of at least 20,000 volts.

3. The system according to claim 2 wherein said voltage source is adapted to provide a voltage difference between said first grid and said second grid between about 40,000 and 60,000 volts.

4. The system according to claim 3 wherein said pulsing mechanism is adapted to provide a pulse frequency between about 2,000 and 5,000 pulses/minute.

5. The system according to claim 4 wherein said system is mateable to an automobile's exhaust system.

6. The system according to claim 2 wherein said pulsing mechanism is adapted to provide a pulse frequency greater than 1600 pulses/minute.

7. The system according to claim 6 wherein said first grid is spaced from said second grid a distance in the range of about 0.635 cm (¼ inch) to 2.54 cm (1 inch).

8. The system according to claim 7 wherein said first grid is spaced a minimum distance from said second grid according to about 0.317 cm (⅛ inch) for 20,000 volts and about an additional 0.317 cm (⅛ inch) for each additional 10,000 volts.

9. The system according to claim 6 wherein said first grid and said second grid are at least partially manufactured from the group consisting of stainless steel, chromium and magnesium alloy.

10. The system according to claim 6 wherein said connector is adapted to apply at least eighty percent (80%) of the voltage difference supplied to said connector to one of said first grid or said second grid.

11. The system according to claim 1 wherein said connector includes:
    a plurality of bare wires juxtaposed in a first curvilinear row and coiled equal-distantly about a curvilinear centerline forming a curvilinear helix;
    a plurality of insulated wires juxtaposed in a second curvilinear row and coiled around said bare wires forming a curvilinear generally rectangular chamber around said bare wires; and
    an insulated center-wire along the curvilinear centerline and disposed within said bare wires and said insulated wires.

12. The system according to claim 11 wherein said plurality of bare wires is four or more bare wires and are grounded.

13. The system according to claim 12 wherein said plurality of insulating wires is three or more insulating wires.

14. The system according to claim 2 wherein said voltage receiving grid is insulated from said first body and said other grid is grounded.

15. The system according to claim 1 wherein said first and second grids communicate with each other to produce a myriad of electrical arcs extending from a plurality of locations on said first and second grids.

16. The system according to claim 1 wherein said first grid, said second grid, and said first chamber have substantially the same cross-sectional area and wherein the exhaust stream passes unobstructed through said chamber between said first and second grids.

17. The system according to claim 1 further comprising a catalyst, wherein said catalyst is in communication to said first body and wherein the exhaust stream is passed through said catalyst.

18. The system according to claim 17 wherein said catalyst is not disposed between said first and second grids.

19. The system according to claim 17 wherein said catalyst comprises a rare earth oxide or metal.

20. The system according to claim 19 wherein said catalyst comprises a noble metal.

21. The system according to claim 17 wherein the nearer of said first grid and said second grid is disposed a distance between a range of about 2.54 cm (1 inch) to 30.48 cm (12 inches) from said catalyst.

22. A method for treating an exhaust stream to reduce pollutants contained therein, said method comprising the steps of:

passing the exhaust stream through a first body forming a first chamber wherein said first chamber has a first grid and a second grid fixed therein and separated from each other by a predetermined distance;

supplying voltage from a voltage source to either said first grid or said second grid to generate electrical charges between said first grid and said second grid;

pulsing the voltage at a predetermined frequency to create electric arcs between said first and second grids, and passing the exhaust stream through a strata.

23. The method of claim 22 wherein said voltage source is adapted to provide a voltage difference between said first grid and said second grid of at least 20,000 volts, said voltage receiving grid is insulated from said first body and said other grid is grounded, and said pulsing mechanism is adapted to provide a pulse frequency greater than 1,600 pulses/minute.

24. A process of reducing pollutants in an exhaust stream, comprising the steps of:

providing a first grid, a second grid and a chamber therebetween;

creating a voltage potential between said first and second grids;

pulsing said voltage at a predetermined frequency;

creating an electric field gradient between said first and second grids;

creating electrical arcs between said first and second grids; and passing the exhaust stream through said first grid, said chamber, and said second grid.

25. The process according to claim 24 wherein said electric field gradient is uniform.

26. The process according to claim 25 wherein said electric field gradient is unidirectional.

27. The process according to claim 25 wherein said first grid, said second grid, and said chamber have substantially the same cross-section.

28. The process according to claim 24 wherein said voltage potential is at least 20,000 volts and wherein said frequency is at least 1600 pulses/minute.

29. The process according to claim 28 further including the step of causing said electrical arcs to form at a multitude of locations between said first and second grids in such a manner to substantially cover the entirety is said chamber between said first and second grids within a relatively short period of time.

* * * * *

UNITED STATES PATENT AND TRADEMARK OFFICE
CERTIFICATE OF CORRECTION

PATENT NO. : 6,508,991 B2
DATED : January 21, 2003
INVENTOR(S) : Paul D. Keppel

It is certified that error appears in the above-identified patent and that said Letters Patent is hereby corrected as shown below:

Column 3,
Line 58, after "insulated wires are juxtaposed" insert -- in a second curvilinear row and coiled around the bare wires. An insulated center core is positioned along the curvilinear centerline and disposed within the bare wires and the insulated wires. --

Column 8,
Line 20, insert after 'a predetermined frequency" insert -- and configured to --.

Column 10,
Line 37, replace "is" with -- of --.

Signed and Sealed this

Tenth Day of August, 2004

JON W. DUDAS
*Acting Director of the United States Patent and Trademark Office*